US010637388B2

(12) United States Patent
Drummond et al.

(10) Patent No.: US 10,637,388 B2
(45) Date of Patent: Apr. 28, 2020

(54) MOTOR DRIVE WITH MOISTURE CONTROL FEATURES

(71) Applicant: Franklin Electric Co., Inc., Fort Wayne, IN (US)

(72) Inventors: Bryan D. Drummond, Bluffton, IN (US); Zachary K. Foster, Spencerville, IN (US)

(73) Assignee: Franklin Electric Co., Inc., Fort Wayne, IN (US)

( * ) Notice: Subject to any disclaimer, the term of this patent is extended or adjusted under 35 U.S.C. 154(b) by 0 days.

(21) Appl. No.: 16/214,950

(22) Filed: Dec. 10, 2018

(65) Prior Publication Data

US 2019/0109554 A1 Apr. 11, 2019

Related U.S. Application Data

(63) Continuation of application No. PCT/US2017/036709, filed on Jun. 9, 2017.
(Continued)

(51) Int. Cl.
| *H02P 27/06* | (2006.01) |
| *H02M 7/00* | (2006.01) |
| *F04B 53/16* | (2006.01) |
| *F04B 17/03* | (2006.01) |
| *F04B 49/06* | (2006.01) |
| *F04B 53/04* | (2006.01) |

(52) U.S. Cl.
CPC .............. *H02P 27/06* (2013.01); *F04B 53/16* (2013.01); *H02M 7/00* (2013.01); *F04B 17/03* (2013.01); *F04B 49/06* (2013.01); *F04B 53/04* (2013.01); *H02M 7/003* (2013.01)

(58) Field of Classification Search
CPC ........ F04B 39/121; F04B 49/10; F04B 53/08; F04B 2201/0801; F04C 23/008; F04C 29/045

See application file for complete search history.

(56) References Cited

U.S. PATENT DOCUMENTS 5,144,702 A * 9/1992 Haraga ................. A61H 33/02
4/541.2
6,321,563 B1 * 11/2001 Ikeda ..................... F04B 49/06
184/6.16
(Continued)

OTHER PUBLICATIONS

International Search Report dated Oct. 6, 2017 in PCT/US2017/036709.
(Continued)

*Primary Examiner* — Rina I Duda
(74) *Attorney, Agent, or Firm* — Faegre Drinker Biddle & Reath

(57) ABSTRACT

A motor control unit including an inverter, a fan to blow air and thereby cool the inverter, and an enclosure configured to maintain the inverter in a dry condition. The enclosure includes a back wall, a bottom wall having a ventilation grid, with the fan positioned adjacent the ventilation grid to draw air therethrough, a top cover member, a central member extending between the top cover member and the bottom wall, and a skirt below the bottom wall defining an at least partially enclosed volume surrounding the ventilation grid, and a droplet diverter to prevent that air drawn by the fan carries water droplets into the enclosure.

20 Claims, 9 Drawing Sheets

Related U.S. Application Data

(60) Provisional application No. 62/348,736, filed on Jun. 10, 2016.

(56) References Cited

U.S. PATENT DOCUMENTS

| | | | |
|---|---|---|---|
| 8,593,099 B2* | 11/2013 | Shibuya | F04B 39/121 |
| | | | 318/461 |
| 2002/0013959 A1 | 10/2002 | Fukasaku et al. | |
| 2006/0222511 A1* | 10/2006 | Nishikawa | F04C 18/3564 |
| | | | 417/213 |
| 2009/0038563 A1* | 2/2009 | Takarai | F01P 7/164 |
| | | | 123/41.02 |
| 2010/0010945 A1 | 5/2010 | Vadillo et al. | |
| 2010/0244458 A1 | 9/2010 | Kotani et al. | |

OTHER PUBLICATIONS

Written Opinion dated Oct. 6, 2017 in PCT/US2017/036709.
International Preliminary Report on Patentability dated Dec. 11, 2018 in PCT/US2017/036709.
Franklin Electric, Market Brochure, "Agricultural Solutions Pumping Systems", at least as early as Jun. 9, 2017.

\* cited by examiner

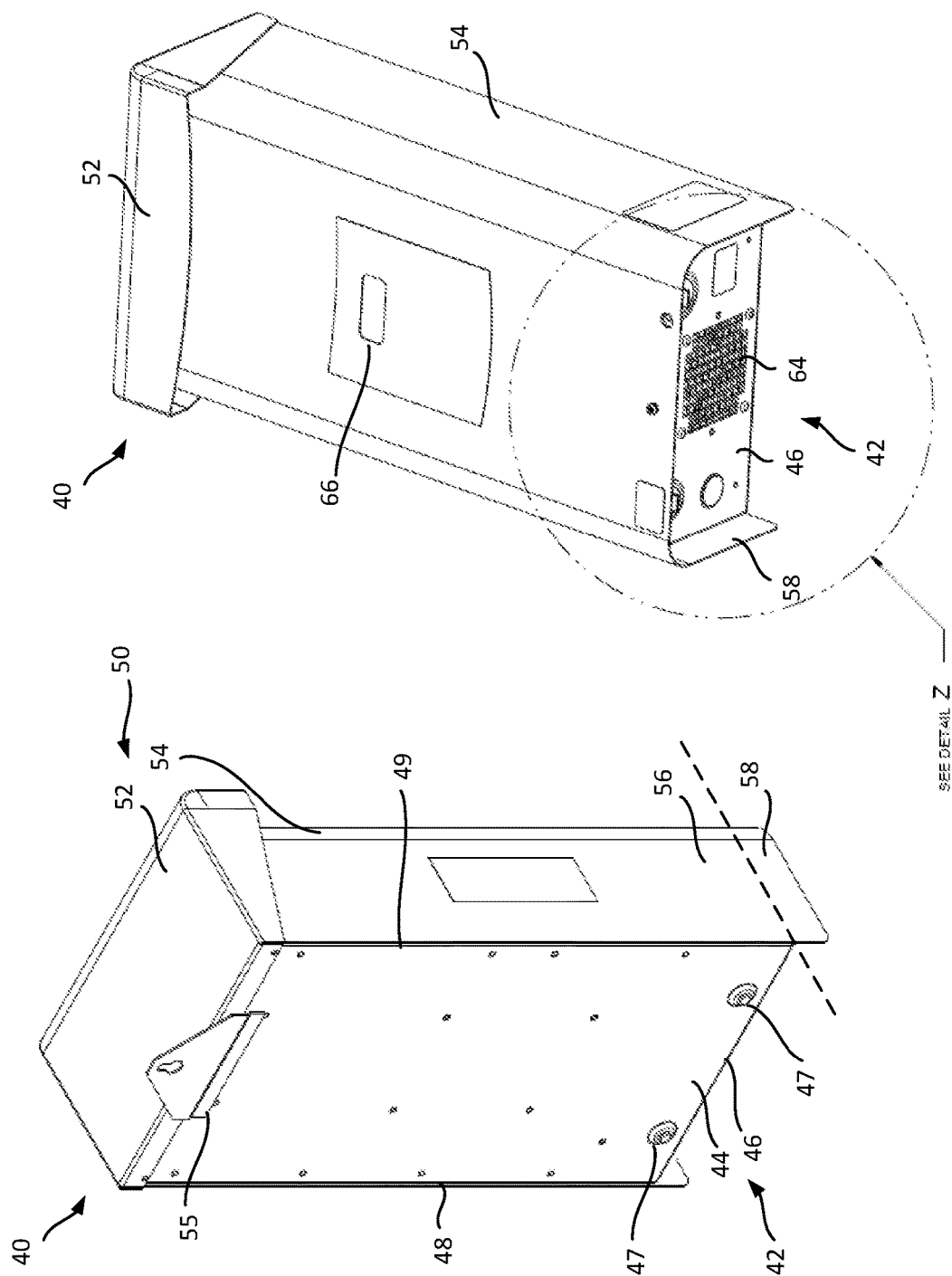

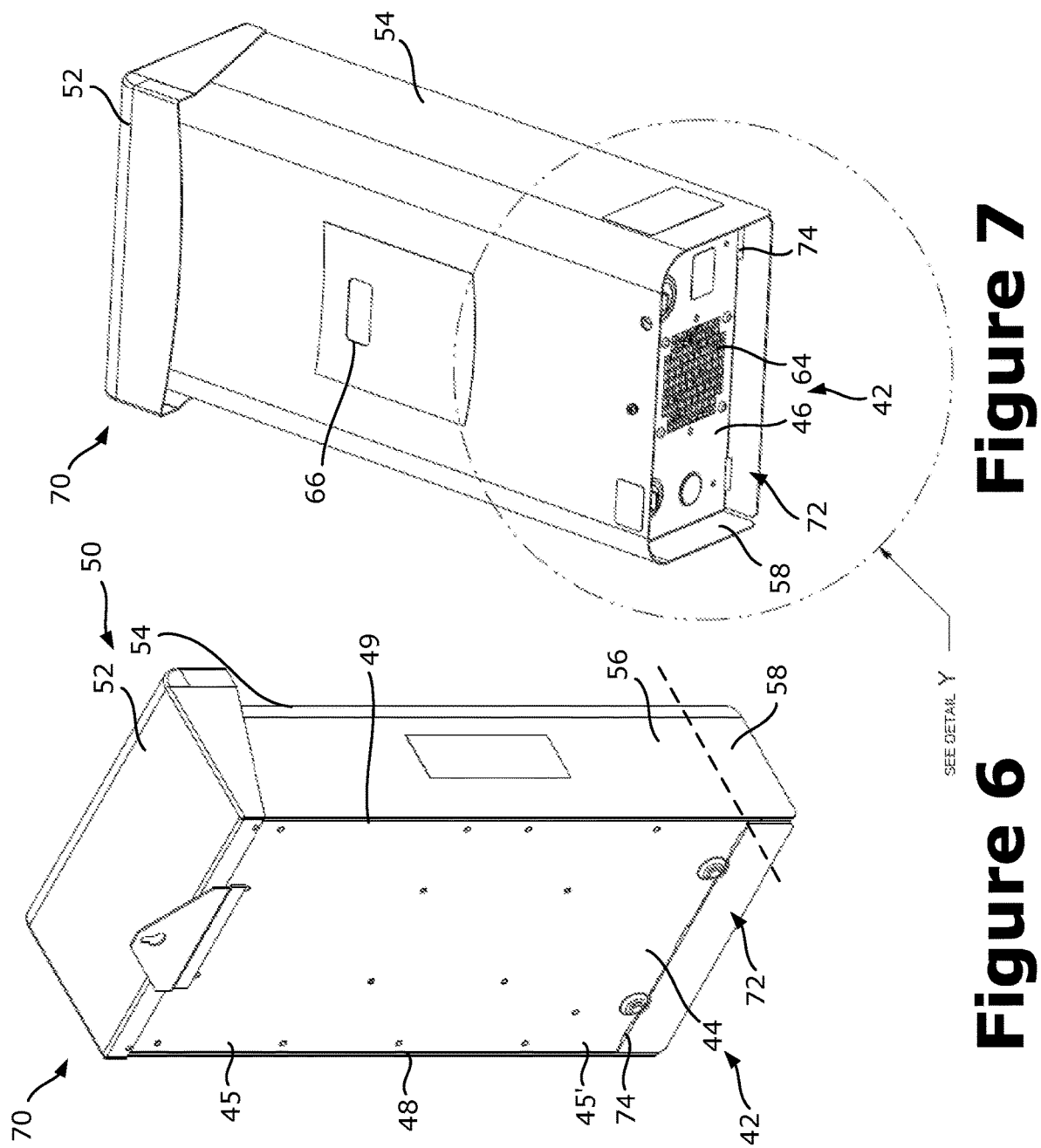

MOTOR DRIVE WITH MOISTURE CONTROL FEATURES

CROSS-REFERENCE TO RELATED APPLICATIONS

The present application is a continuation of international application no. PCT/US17/36709, filed on Jun. 9, 2017, which claims the benefit of U.S. Provisional Patent Application No. 62/348,736, filed Jun. 10, 2016; said applications are incorporated herein by reference in their entirety.

FIELD OF THE DISCLOSURE

An enclosure including structural features to control moisture. More specifically, an enclosure including structural features to divert water droplets.

BACKGROUND OF THE DISCLOSURE

Motor control units for fluid pumping applications can be installed outdoors. Housings can be provided that withstand rain without allowing the electronic components of the control units to become wet, which would cause them to fail. A housing can be large and may include a heat sink, for example. The heat sink may be positioned at least partially outside the enclosure and can become wet without damaging the electronic components. Air circulates naturally through fins of the heat sink to passively cool the electronic components. However heat sinks require space and are relatively expensive.

An alternative or complementary approach to cool the electronic components is to provide a fan with upper and lower ventilation openings in the enclosure to enable the fan to circulate air through the enclosure to actively cool the electronic components. But while a fan may reduce the cost and space requirements of the motor control unit, active cooling can draw moisture into the enclosure, reducing the life of the motor control unit. Therefore, improvements are needed to maintain the internal volume of the enclosure in a dry state while also sufficiently cooling the electronic components without increasing the size or cost of the motor control units.

The background to the disclosure is described herein to explain the context of the present invention. This is not to be taken as an admission or a suggestion that any of the material referred to was published, known or part of the common general knowledge in the art to which the present invention pertains, in the United States or in any other country, as at the priority date of any of the claims.

SUMMARY

Provided are embodiments of an enclosure for electronic components and a motor control unit including the enclosure. The enclosure and motor control unit include moisture control features provided to maintain the internal volume of the enclosure in a dry state while also cooling the enclosure sufficiently without increasing the size or cost of the control units. In some embodiments, the motor control unit comprises an inverter to convert a direct-current voltage to an alternating-current voltage adapted to energize a motor; a fan to generate an air velocity; and an enclosure, wherein the rectification circuit, the inverter, and the fan are positioned in the enclosure, the enclosure including: a back wall having a top portion and a bottom portion opposite the top portion; a bottom wall extending from the bottom portion of the back wall, the bottom wall having a ventilation grid, wherein the fan is adjacent the ventilation grid to draw air therethrough; a top cover member extending from the top portion of the back wall; a central member extending between the top cover member and the bottom wall to define an enclosed space; and droplet diverter means for diverting a droplet of water that drips along an external surface of the enclosure from a first separation point at which the droplet freefalls from the enclosure to a second separation point at which the droplet freefalls from the enclosure, the air velocity of the air drawn by the fan adjacent the first separation point being sufficient to carry the droplet of water into and through the ventilation grid, and the air velocity of the air drawn by the fan adjacent the second separation point being insufficient to carry the droplet of water into and through the ventilation grid.

In a variation of the present embodiment, the distance from the first separation point to the center of the fan is shorter than the distance from the second separation point to the center of the fan.

In a variations of the present embodiment, the motor control unit comprises a skirt below the bottom wall defining an at least partially enclosed volume surrounding the ventilation grid, wherein the droplet diverter means comprises a plate that extends below the bottom wall providing a surface along which the droplet of water drips before separating from the enclosure into said freefall at the second separation point.

In some embodiments, an enclosure assembly method comprises: providing a top cover member; providing an L-shaped plate defining a back wall and a bottom wall; attaching the top cover member to the L-shaped plate; providing a central cover member defining a front wall, a left wall, and a right wall; attaching the central cover member to the L-shaped plate and the top cover member to form an enclosed space therebetween, wherein the bottom wall contacts the central cover member intermediate a top edge and a bottom edge thereof, thereby defining a skirt formed by a bottom portion of the central cover member; mounting a fan adjacent the ventilation grid; and providing droplet diverter means for diverting a droplet of water that drips along an external surface of the enclosure to prevent the droplet from freefalling from a first separation point on the enclosure and cause the droplet to freefall from a second separation point on the enclosure, the air drawn by the fan adjacent the first separation point having a first velocity sufficient to carry the droplet through the ventilation grid and the air drawn by the fan adjacent the second separation point having a second velocity which is not sufficient to carry the droplet through the ventilation grid.

DESCRIPTION OF THE DRAWINGS

The features and advantages of the disclosure will become more readily appreciated as the same become better understood by reference to the following detailed description when taken in conjunction with the accompanying drawings, where:

FIGS. 2 and 3 are rear and front perspective views of an embodiment of an enclosure for electronic controls of a motor control unit;

FIGS. 6 and 7 are rear and front perspective views of the embodiment of the motor control drive of FIG. 5;

Figure 1:
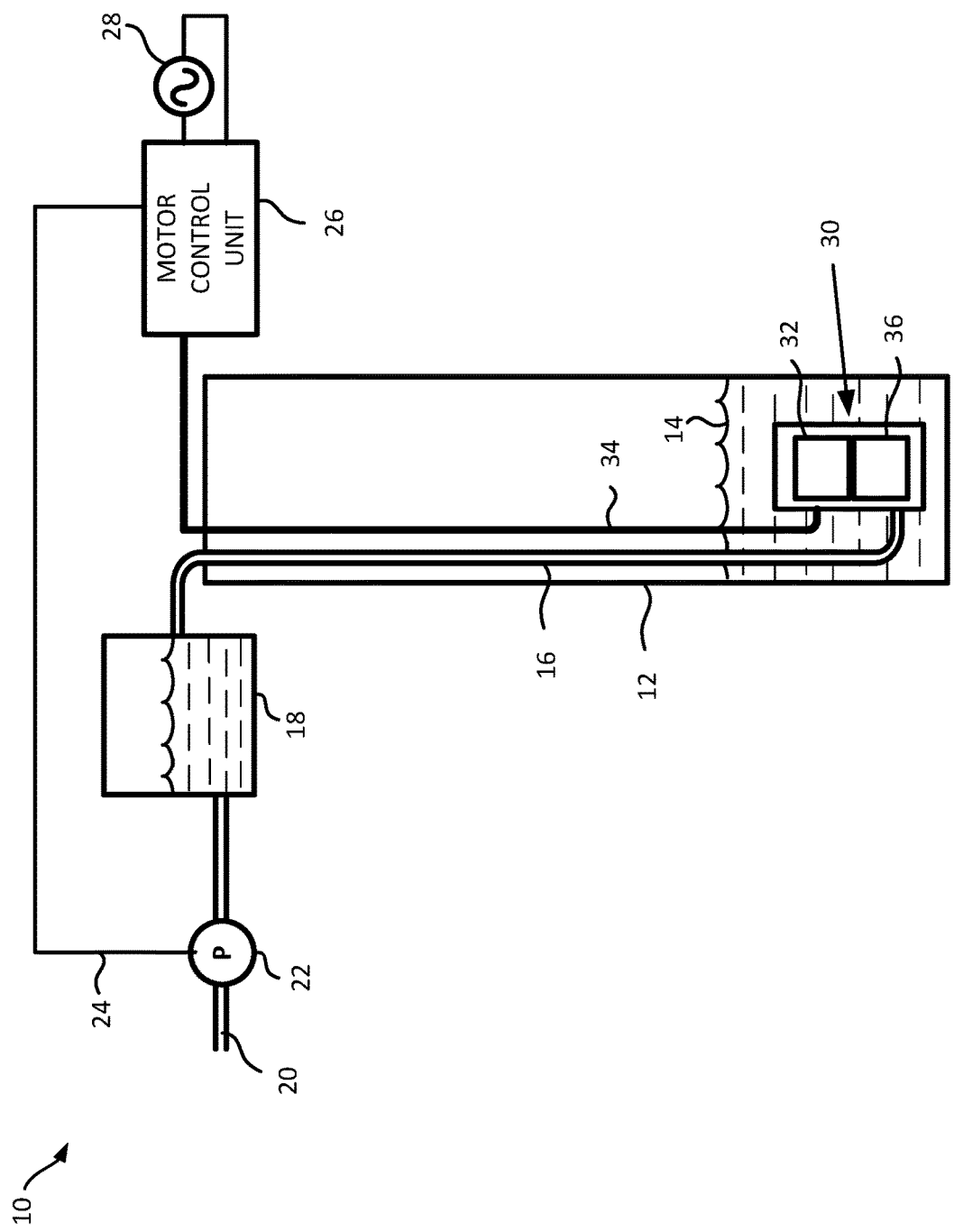
FIG. 1 is a diagrammatic view of a liquid supply system including a motor control unit enclosed in a housing.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure. The exemplification set out herein illustrates embodiments of the invention, and such exemplifications are not to be construed as limiting the scope of the invention in any manner.

DETAILED DESCRIPTION

For the purposes of promoting an understanding of the principles of the invention, reference will now be made to the embodiments illustrated in the drawings, which are described below. The embodiments disclosed herein are not intended to be exhaustive or limit the claims to the precise form disclosed in the following detailed description. Rather, the embodiments are chosen and described so that others skilled in the art may utilize their teachings. It will be understood that no limitation of the scope of the claims is thereby intended. The present invention includes any alterations and further modifications in the illustrated devices and described methods and further applications of the disclosed principles which would normally occur to one skilled in the art to which the disclosure relates.

Except where a contrary intent is expressly stated, terms are used in their singular form for clarity and are intended to include their plural form.

As used herein, the terms "comprises," "comprising," "containing," and "having" and the like denote an open transition meaning that the claim in which the open transition is used is not limited to the elements following the transitional term. The terms "consisting of" or "consists of" denote closed transitions.

The terms "first," "second," "third," "fourth," and the like in the description and in the claims, if any, are used for distinguishing between similar elements and not necessarily for describing a particular sequential or chronological order. It is to be understood that any terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

Occurrences of the phrase "in one embodiment," or "in one aspect," herein do not necessarily all refer to the same embodiment or aspect.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Embodiments of an enclosure according to the invention are generally configured to maintain electronic components positioned within the enclosure in a dry condition. In some embodiments, the enclosure generally includes a back wall having a top portion and a bottom portion opposite the top portion; a bottom wall extending from the bottom portion of the back wall and having a ventilation grid, with a fan positioned over the ventilation grid to draw air therethrough, a top cover member extending from the top portion of the back wall; a central member extending between the top cover member and the bottom wall opposite the back wall; a skirt below the bottom wall defining an at least partially enclosed volume surrounding the ventilation grid; and a droplet diverter. Example droplet diverters include a plate that extends below the bottom wall, an elongate protrusion that extends outwardly from the back wall above the bottom wall, an elongate protrusion that extends outwardly from the back wall above the bottom wall and slopes downwardly, an elongate indentation that extends inwardly from the back wall above the bottom wall, an elongate indentation that extends inwardly from the back wall above the bottom wall and slopes downwardly, and any other structural feature configured to divert water droplets wherein absent the droplet diverter a droplet of water that dripped along the exterior surface of the back wall would separate from the enclosure into freefall at a first separation point, the air drawn by the fan having a first velocity at substantially the first separation point sufficient to carry the droplet of water into and through the ventilation grid thereby introducing moisture into the housing volume, the droplet diverter providing a surface along which the droplet of water would drip before separating from the enclosure into said freefall at a second separation point, the air drawn by the fan having a second velocity at substantially the second separation point lower than the first velocity and insufficient to carry the droplet of water into and through the ventilation grid, thereby maintaining the housing volume in said dry condition.

The speed of the fan is unchanged. The air velocity difference results from the difference in distances from the center of the fan to the first and second separation points. In the present context "substantially" refers to the distance below the separation point which a molecule of water would travel before being carried by the air current created by the fan. The air current does not necessarily contact the edge of the back wall as it curves from the support structure to the bottom wall. One could consider also that "substantially" encompasses the point in space below the edge of the back wall or the plate (or drip guard), where the air velocity is at a maxima, since if such velocity does not carry a droplet then the velocity measured anywhere else below the edge will also be insufficient. In variations of the foregoing embodiment, the back wall may be permanently affixed to the bottom wall or be separable therefrom; the back wall may be permanently affixed to the top cover member or be separable therefrom; and the top cover member may be permanently affixed to the central member or be separable therefrom. In one embodiment, the central member is permanently affixed to the top cover member and the bottom wall. In another embodiment, the central member is permanently affixed to the top cover member and removably secured to the bottom wall. An opening between the top cover member and the central member allows air drawn by the fan to flow out of the enclosure.

Advantageously, the droplet diverter enables operation of the fan at a higher velocity than is possible without the droplet diverter, without introducing moisture into the enclosure. Without being bound by theory, it is believed that the droplet diverter causes water droplets to separate from the enclosure into freefall at a point which is further away from the fan that would be the case without the droplet diverter, and in so doing cause the water droplets to freefall where the air velocity is reduced and insufficient to carry the water droplets into the enclosed space. Operation at higher speed increases cooling capacity without increasing size and without increasing, or marginally increasing, cost.

Fluid supply systems use motors to drive pumps and transfer fluids. A sensor measures a characteristic of the fluid, and a motor control unit controls operation of the motor based on the value of the measured characteristic. The motor control unit comprises an enclosure and electronic components housed in the enclosure. The electronic components may comprise an inverter to generate AC voltage to drive an electric motor. The electronic components may also comprise a converter to convert a supply line voltage to a DC voltage to feed the inverter. DC voltage sources may also be used to feed the inverter. An example of a liquid supply system is described with reference to FIG. 1.

FIG. 1 illustrates a liquid supply system 10 comprising a reservoir 12 containing a liquid 14 which is pumped by a pump unit 30 through a conduit 16 into a reservoir 18. Pump unit 30 includes a pump 36 driven by a motor 32 which is powered by a motor control unit 26 through a cable 34. Reservoir 12 may be a deep-well. Motor 32 may be a conventional single-phase induction motor and pump 36 may be a conventional centrifugal pump. Cable 34 may comprise two or three wires to provide power to motor 32. A conventional one-way check valve (not shown) may be provided between pump 36 and reservoir 18 to prevent backflow of liquid 14. During operation of the system, liquid flows out of reservoir 18 through a conduit 20. A pressure sensor 22 is disposed in conduit 20 and provides a pressure signal through line 24 to motor control unit 26, which is powered by an electrical power source 28. Reservoir 18 may be an aboveground or underground tank, a well casing, or any other reservoir containing liquid 14. In some embodiments, reservoir 18 comprises a pressurized tank. Motor control unit 26 may comprise an enclosure 40, 70, 90, 93, 200 discussed with reference to FIGS. 2-12 and 14, configured to enclose electronic components therein. Enclosure 40, 70, 90, 93, 200 may be rated for outdoor use and therefor may be capable to withstand rain without permitting the rain to enter and potentially damage the electronic components.

Figure 4:
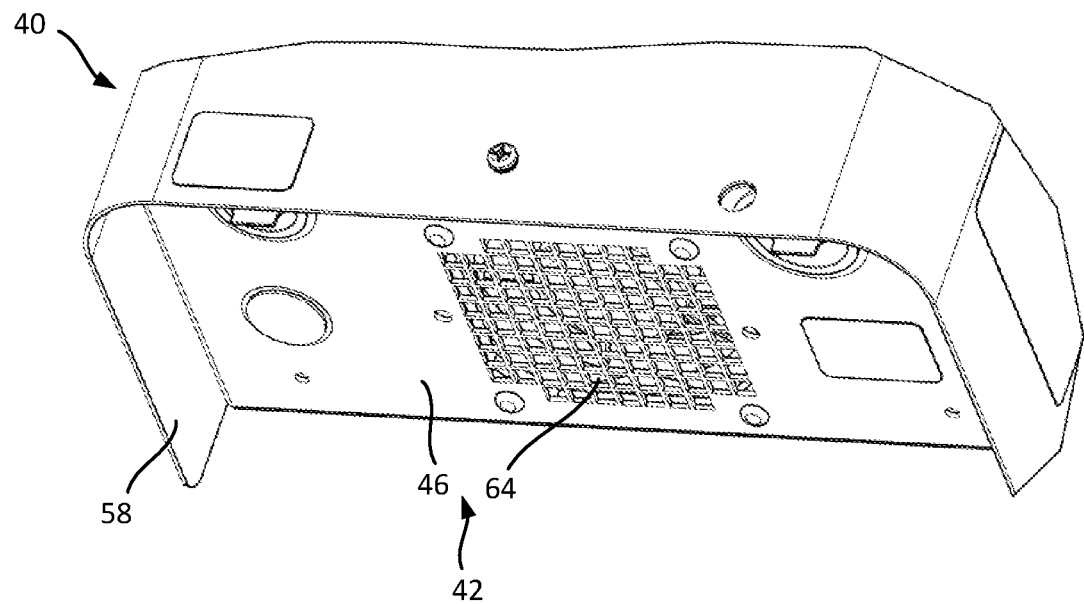
FIG. 4 is a bottom perspective view of a section of the embodiment of the enclosure of FIGS. 2 and 3.

FIGS. 2-4 are rear, front, and bottom perspective views of enclosure 40. Enclosure 40 includes a base member 42 and a cover member 50. Base member 42 comprises a back wall 44, a bottom wall 46, and a ventilation grid 64. A mounting tab 55 is attached to back wall 44. A pair of mounting protrusions 47 extend from back wall 44. Securement elements (not shown) pass through holes in mounting protrusions 47 and mounting tab 55 to secure enclosure 40 to a support structure (not shown), such as an exterior wall. Mounting tab 55 and mounting protrusions 47 extend from the exterior surface of back wall 44 to provide a three-point securement feature that facilitates mounting of enclosure 40 on uneven support structures. A space, or water channel, is formed between the support structure and the exterior surface of back wall 44. When it rains, water droplets may drip through the space. Securement elements include screws, nails, bolts, pins, and any member sized and configured to be connected to the support structure and pass through the holes in mounting tab 55 and mounting protrusions 47. To mount enclosure 40 onto the support structure, enclosure 40 is supported by the user against the support structure and the user then places the securement elements through the holes from the interior of enclosure 40 and mounting tab 55.

Inside enclosure 40 is a ventilation fan 60 (shown in FIG. 9) located adjacent ventilation grid 64 to draw air therethrough and blow the air through enclosure 40 to draw heat from the electronic components. Cover member 50 includes a top cover member 52 attached to a central cover member 54. Central cover member 54 comprises a main portion 56 which generally extends to bottom wall 46, and a protruding portion or skirt 58 that extends from main portion 56 below bottom wall 46. Right and left edges 48 and 49, respectively, of back wall 44 are shown. The right and left edges, and/or sides, are determined while looking at enclosure 40 from the front, the right edge corresponding to the right side of the viewer. A display 66 is shown on the front side of enclosure 40. Display 66 may present information to the user including preset pressure, actual pressure, and fault codes.

Figure 5:
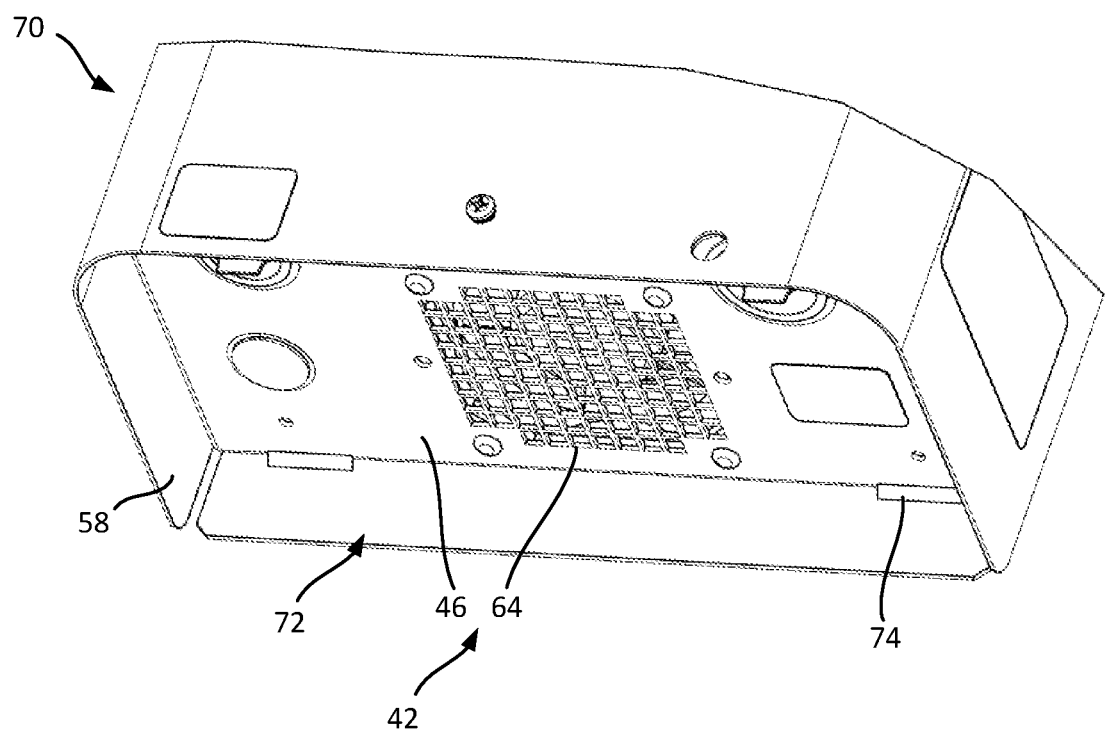
FIG. 5 is a bottom perspective view of a section of another embodiment of an enclosure of a motor control unit showing an embodiment of a droplet diverter.

Referring now to FIGS. 5-7, a motor control unit 26 comprising an enclosure 70 configured to maintain an interior of motor control unit 26 in a dry condition is presented. Enclosure 70 defines a housing volume 86 in which a fan 60 is positioned (both shown in FIG. 9). Motor control unit 26 further comprises electronic circuits and components described in detail with reference to FIG. 13, including a rectifier 120 and an inverter 130. Fan 60 blows air through housing volume 86 and thereby cools the electronic components. Enclosure 70 is similar to enclosure 40 in function, and additionally includes a droplet diverter configured to divert water droplets falling along the exterior of the back wall of enclosure 70 and thereby prevent air drawn by fan 60 from sucking the water droplets into housing volume 86. Enclosure 70 includes back wall 44, bottom wall 46, top cover member 52, central member 54, skirt 58, and a droplet diverter, illustratively a plate 72. Plate 72 may be flat or contoured. A flat plate is shown. Back wall 44 includes a top portion 45 and a bottom portion 45' opposite top portion 45, and bottom wall 46 extends from bottom portion 45' of back wall 44. Bottom wall 46 includes ventilation grid 64. Fan 60 is positioned over ventilation grid 64 to draw air therethrough, as described with reference to FIG. 9. Skirt 58 extends below bottom wall 46 and defines an at least partially enclosed volume 88 (described with reference to FIG. 9.) surrounding ventilation grid 64. Partially enclosed volume 88 may be enclosed in at least three sides—front, right, and left, thereby forming a partial plenum that in part controls the air velocity drawn by the fan on the rear side of enclosure 70 below the bottom wall.

In various embodiments, back wall 44 and bottom wall 46 may form a single piece, integral base member 42 that is L-shaped. Further, in various embodiments top cover member 52 and central member 54 may form a single piece cover member 50. In various embodiments, skirt 58 is affixed to and extends from central member 54.

Figure 10:
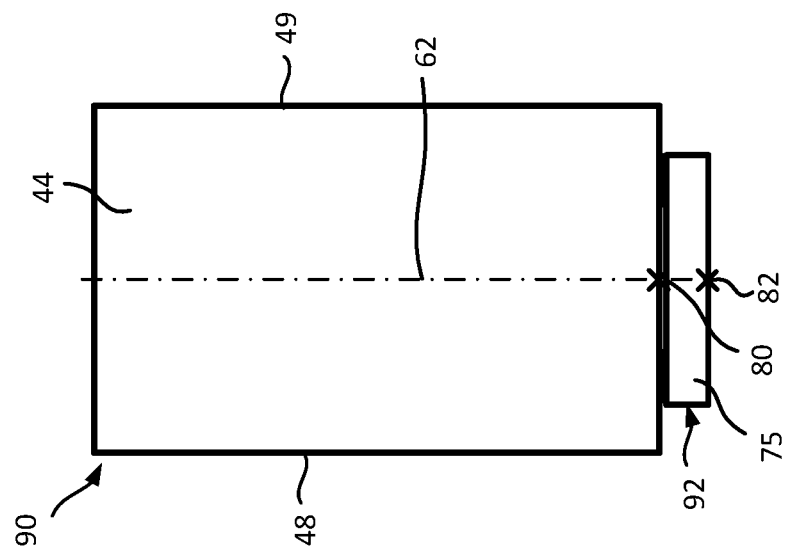
FIG. 10 is a rear view of another embodiment of an enclosure for electronic controls of a motor control unit.
Figure 9:
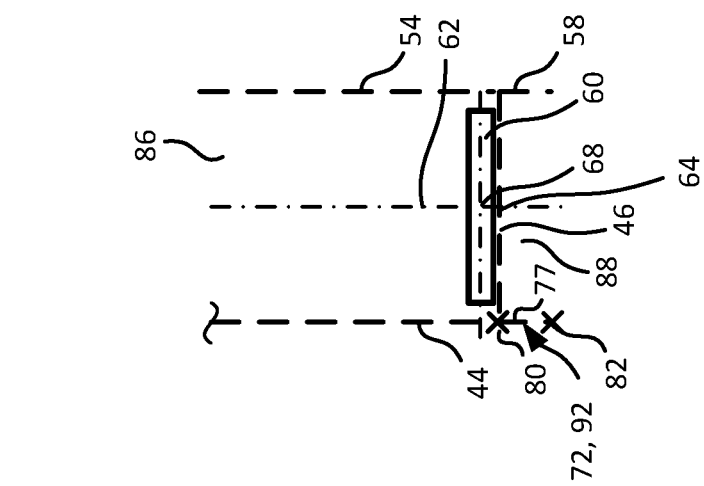
FIG. 9 is a lateral sectional view of the embodiments of the enclosures depicted in FIGS. 8 and 10.
Figure 8:
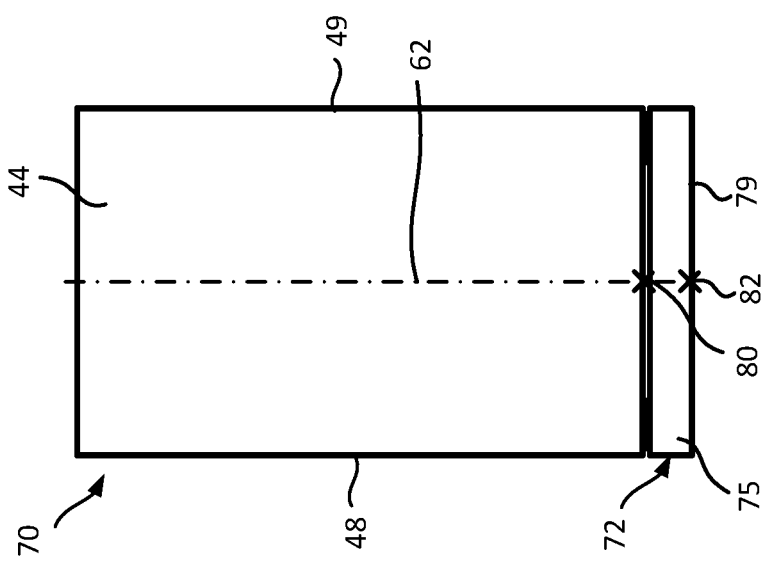
FIG. 8 is a rear view of a back wall of the embodiment of the enclosure depicted in FIGS. 5-7.

Referring now to FIGS. 8 and 9, plate 72 provides a surface 75 along which a droplet of water may travel or drip before separating from enclosure 70 into freefall. FIG. 9 is a lateral sectional view of the embodiments of the enclosures depicted in FIGS. 8 and 10 and illustrates interior volume 86, defined in part by back wall 44, central member 54, and bottom wall 46, and partially enclosed volume 88, defined in part by bottom wall 46, plate 72, and skirt 58. The rotation axis of fan 60 is denoted by numeral 62. The center of fan 60 is denoted by numeral 68 and is located at the intersection of a plane perpendicular to rotation axis 60 and bisecting the fan blade of fan 60. Without plate 72, a droplet of water dripping along back wall 44 separates from enclosure 70 into freefall at a first separation point 80 at which a first velocity of air drawn by the fan is sufficient to carry the droplet of water into and through ventilation grid 64, thereby introducing moisture into housing volume 86. With plate 72, the droplet of water dripping along back wall 44 drips along surface 75 and separates from enclosure 70 into freefall at a second separation point 82 at which a second velocity of air drawn by the fan is insufficient to carry the droplet of water into ventilation grid 64, thereby maintain housing volume 86 in a dry condition. In general, second separation point 82 is at a greater distance from fan 60, and particularly center 68 of fan 60, than first separation point 80. FIG. 10 is a rear view of another embodiment of an enclosure, denoted by numeral 90, including a plate 92 which is similar but not as wide as plate 72. Plate 92 also includes surface 75 along which droplets of water may drip. The width of plate 92 may be defined to change or control air velocity at second separation point 82.

Plate 72 extends laterally from left edge 48 to right edge 49 of back wall 44. Accordingly, back wall 44 and plate 72 may have substantially coextensive widths. Plate 92 has a width less than a width of back wall 44. Plate 72 and plate 92 may traverse a plane perpendicular to back wall 44 that passes through rotational axis 62. In other words, plates 72, 92 are adjacent the portion of the fan that is closest to back wall 44. Plate 72 and plate 92 may extend at least partially below bottom wall 44 and comprise a surface 77 facing skirt 58 to further enclose partially enclosed volume 88, and an elongate bottom edge 79 from which the droplet of water may freefall.

In various embodiments, plate 72 or 92 and skirt 58 may extend from bottom wall 44 by a substantially equal amount such that elongate bottom edge 79 and the bottom edge of skirt 58, collectively, provide a level edge upon which motor control unit 26 may be rested before installation.

In various embodiments, plates 72 (or 92) may be affixed to an edge formed at the juncture of back wall 44 and bottom wall 46. Alternatively, plate 72 (or 92) may be affixed to bottom wall 46 such that back wall 44 and plate 72 (or 92) extend on different planes.

Figure 11:
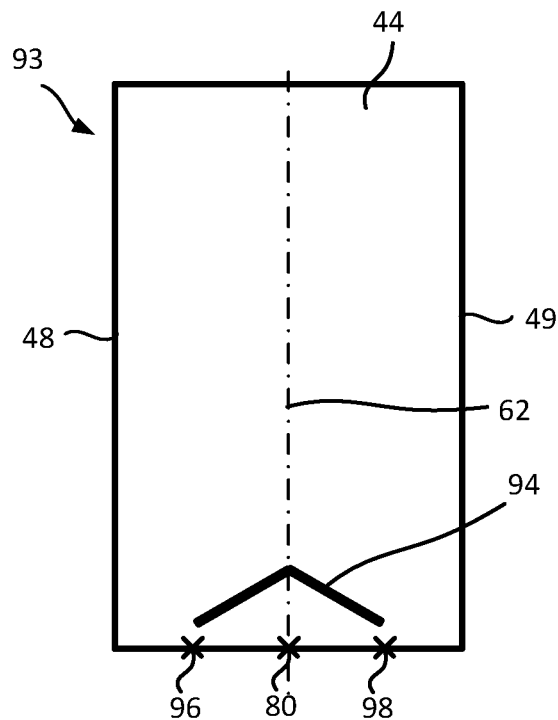
FIG. 11 is a rear view of a back wall of an enclosure showing another embodiment of a droplet diverter.
Figure 12:
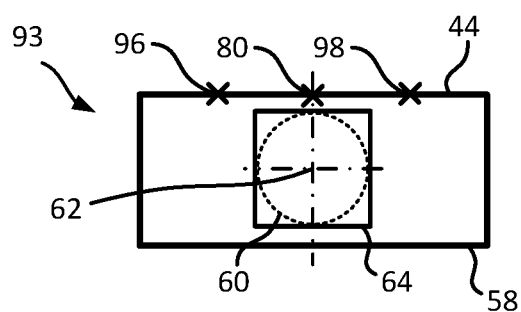
FIG. 12 is a bottom view of the embodiment of the enclosure of FIG. 11.

Referring to FIGS. 11 and 12, a droplet diverter 94 is shown. Droplet diverter 94 may comprise an elongate protrusion extending outwardly from back wall 44 above bottom wall 46. Droplet diverter 94 may comprise an elongate indentation extending inwardly from back wall 44 above bottom wall 46. Droplet diverter 94 may slope downwardly. First separation point 80 is located on a plane perpendicular to back wall 44 and passing through rotational axis 62, as described above, and second separation points 96 and 98 are located laterally away from said plane. The plane may also pass through droplet diverter 94. Droplet diverter 94 directs water droplets traveling along back wall 44 away from the center region of back wall 44 and toward edges 48 and 49 such that second separation points 96 and 98 are a greater distance from ventilation grid 64 than first separation point 80.

Although droplet diverter 94 is illustrated as having right and left sides sloping at different angles, in various embodiments droplet diverter 94 may comprise only one of the sides, which extends through the center of back wall 44, and which may be straight or curved or include curved and straight portions.

Figure 13:
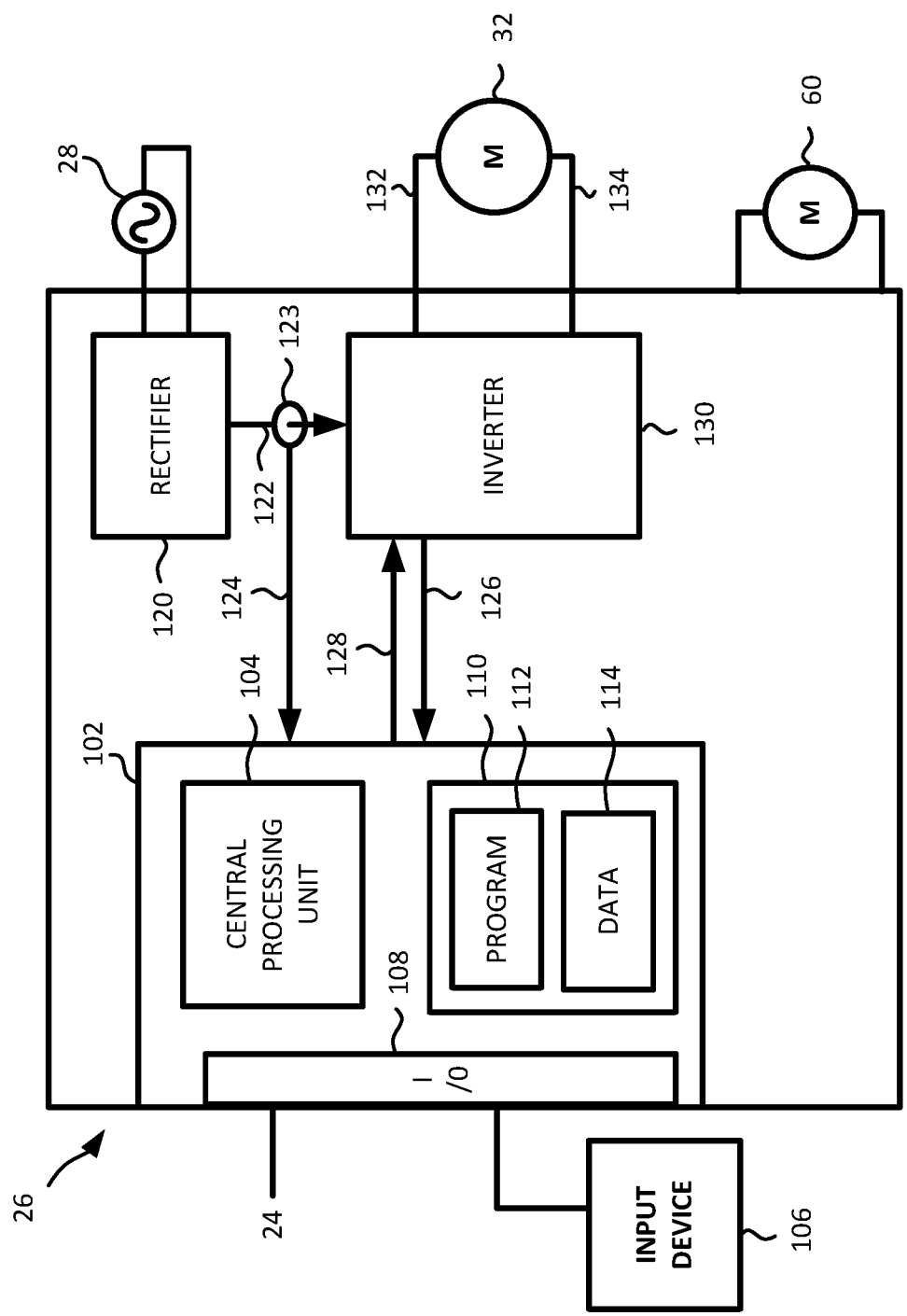
FIG. 13 is a block diagram of a motor control unit housed in an enclosure according to any of the embodiments disclosed herein.

FIG. 13 illustrates an embodiment of motor control unit 26 housed in an enclosure, for example enclosure 70, 90, 93. Motor control unit 26 comprises a processing device, illustratively processing unit 102, rectifier 120 and inverter 130. As shown, processing unit 102 includes a CPU 104 configured to access a memory device 110 and execute processing instructions from a software application, exemplified by program 112, based on data 114. Techniques for generating motor voltages according to characteristics of a control voltage are known in the art. In one example, a technique comprises storing values in a table corresponding to samples of an operating curve. The operating curve is typically a substantially straight line defining a volts-hertz relationship. When the speed control system determines a desired operating speed, which defines an operating frequency, the drive unit looks up a voltage corresponding to the frequency. The drive unit then generates a motor voltage based on the voltage and the frequency. In another example, a formula or a function embodying the operating curve characteristics is used by CPU 104 to generate the desired motor voltages.

Rectifier 120 is powered by a power source 28 and includes any rectification circuit well known in the art, e.g. a diode bridge, to convert alternating-current (AC) voltage supplied by power source 28 into direct-current (DC) voltage with it supplies to inverter 130. Inverter 130 receives DC power from rectifier 120 through a conductor 122 and converts the DC power into an AC motor power. Power source 28 also powers a transformer (not shown) coupled to fan 60.

CPU 104 receives inputs through an I/O interface 108 and outputs a control voltage over line 128 to inverter 130. An input device 106 may be provided to program motor control unit 106 or to receive alerts therefrom. Input device 106 may comprise a smart device connected via a universal serial bus (USB) connector or via a wireless connection. An application running on input device 106 provides a user interface by which the user may set the water pressure setpoint of system 10. Example input devices include smart phones, computing tablets, portable computers, and any other device capable to execute a program to provide a user interface by which the user can communicate with motor control unit 26. In one example, the control voltage is provided to a pulse-width-modulated (PWM) module having power switches and control logic which generates the appropriate gating signals for the power switches to convert the DC power supplied by rectifier 120 to the AC motor voltage suitable to drive the motor according to the control voltage. Current drawn by inverter 130 from rectifier 120 is sensed by a current sensor 123 and a current signal is provided by current sensor 123 to CPU 104 by conductor 124. Motor voltage feedback can also be provided, for example through conductor 126 connecting inverter 130 and processing unit 102. Motor voltages may also be generated with other known or later developed drive topologies programmed in accordance with embodiments of the disclosure. Conductors 132, 134 couple inverter 130 to motor 32 to provide the motor voltage from inverter 130 to motor 32.

In a more general embodiment, the motor drive comprises control logic operable to generate the control voltage. The term "logic" as used herein includes software and/or firmware executing on one or more programmable processors, application-specific integrated circuits, field-programmable gate arrays, digital signal processors, hardwired logic, or combinations thereof. Therefore, in accordance with the embodiments, various logic may be implemented in any appropriate fashion and would remain in accordance with the embodiments herein disclosed. A non-transitory machine-readable medium comprising logic can additionally be considered to be embodied within any tangible form of a computer-readable carrier, such as solid-state memory, magnetic disk, and optical disk containing an appropriate set of computer instructions and data structures that would cause a processor to carry out the techniques described herein. A non-transitory computer-readable medium, or memory, may include random access memory (RAM), read-only memory (ROM), erasable programmable read-only memory (e.g., EPROM, EEPROM, or Flash memory), or any other tangible medium capable of storing information.

Various embodiments of an enclosure have been disclosed. Depending on the size and speed of the fan, a droplet diverter may be desirable. A test chamber may be used to simulate rain/water sprays as per UL 50E standard, or IEC-60529, IS-9000 Part XVI-1983, or JIS-D 0203-1976 standards. Based on the foregoing test standards, a method of designing a motor control unit comprises (a) constructing an enclosure for the motor control unit, the enclosure including a back wall having a top portion and a bottom portion opposite the top portion; a bottom wall extending from the bottom portion of the back wall, the bottom wall having a ventilation grid; a top cover member extending from the top portion of the back wall; a central member extending between the top cover member and the bottom wall opposite the back wall; and a skirt below the bottom wall defining an at least partially enclosed volume surrounding the ventilation grid; (b) mounting a fan over the ventilation grid; (c) operating the fan to draw air through the enclosure; (d) causing water droplets to drip from the back wall of the enclosure while operating the fan at a preselected speed; (e) observing water droplets inside the enclosure; and (f) adding a droplet diverter to prevent entry of the water droplets into the enclosure. Causing water droplets to drip from the back wall of the enclosure may be performed by operating the foregoing test chamber to spray water on the enclosure. According to the rain tests, a substantial amount of water is sprayed from spray nozzles directed to the front, top, and sides of the enclosure at a downward angle. The water flows over the top or from the sides into the water channel behind the enclosure.

The fan blade size and speed determine the amount of air displaced, in CFM (cubic feet per minute). At some speeds the fan may not draw water while at other, higher, speeds it might. The size of the enclosure also determines how close to the back wall of the enclosure the fan is positioned, which influences the air velocity at the first separation point. According to the disclosed embodiment, one or more of the droplet diverters disclosed above may be added to the enclosure thereby maintaining the enclosure in a dry state under the most stringent test conditions, which may represent the most stringent actual conditions likely to be experienced by the enclosure in actual use.

In some embodiments, a mounting bracket is provided that is removably secured to the enclosures described above. The body of the mounting bracket includes the three-point securement feature and forms a portion of the water channel with the support structure. Advantageously, the mounting bracket includes the mounting holes and therefore can be used as a template for drilling holes in the support structure, which is easier and more convenient to do so than making the holes through the enclosure. The mounting bracket can be secured to the support structure, and then the enclosure body is secured to the mounting bracket. The mounting bracket also includes the plate, or drip guard, discussed with reference to FIGS. 5-10. Of course, the mounting bracket could easily accommodate embodiments of the droplet diverter discussed with reference to FIGS. 11-12.

Figure 14:
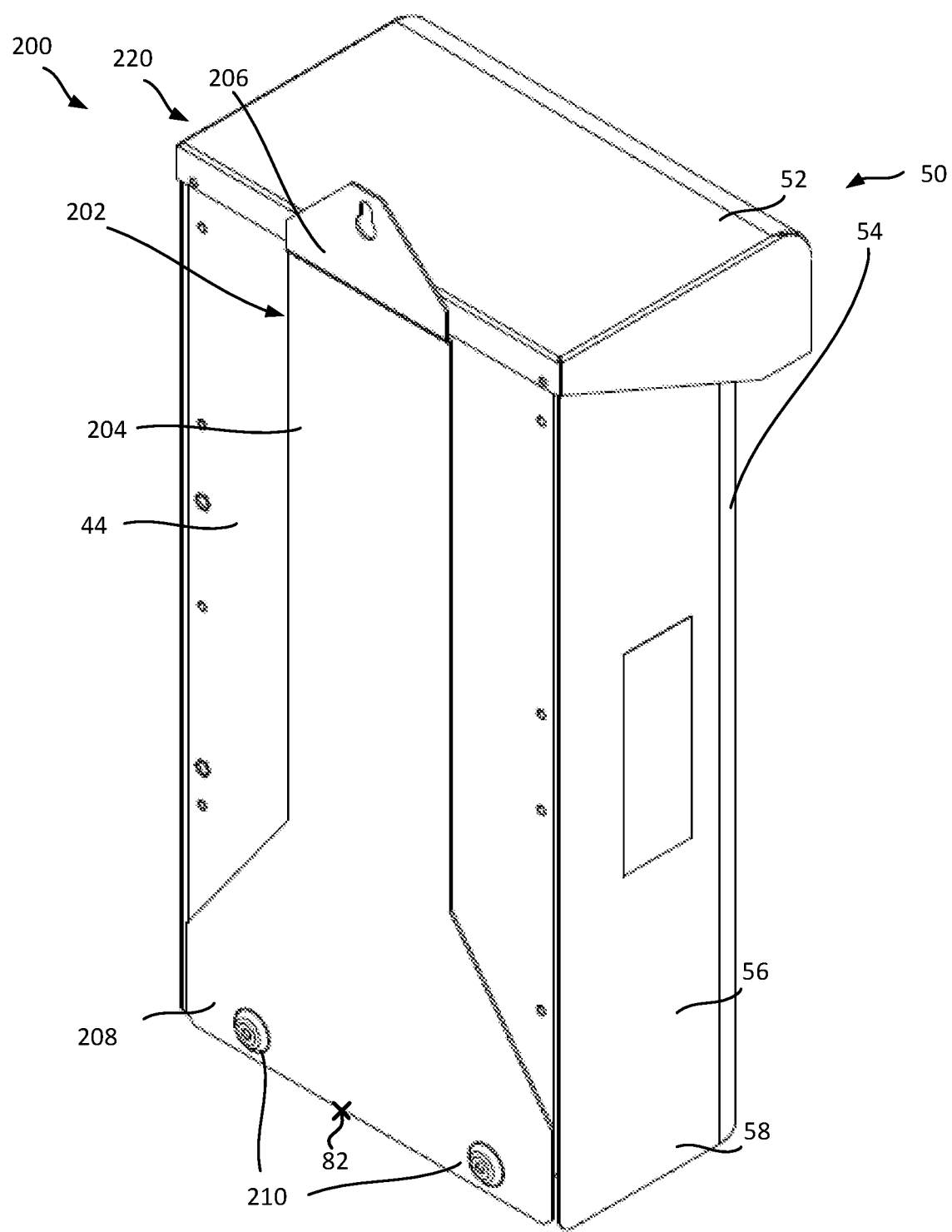
FIGS. 14-16 are rear, front, and bottom perspective views of another embodiment of an enclosure for electronic controls of a motor control unit.
Figure 16:
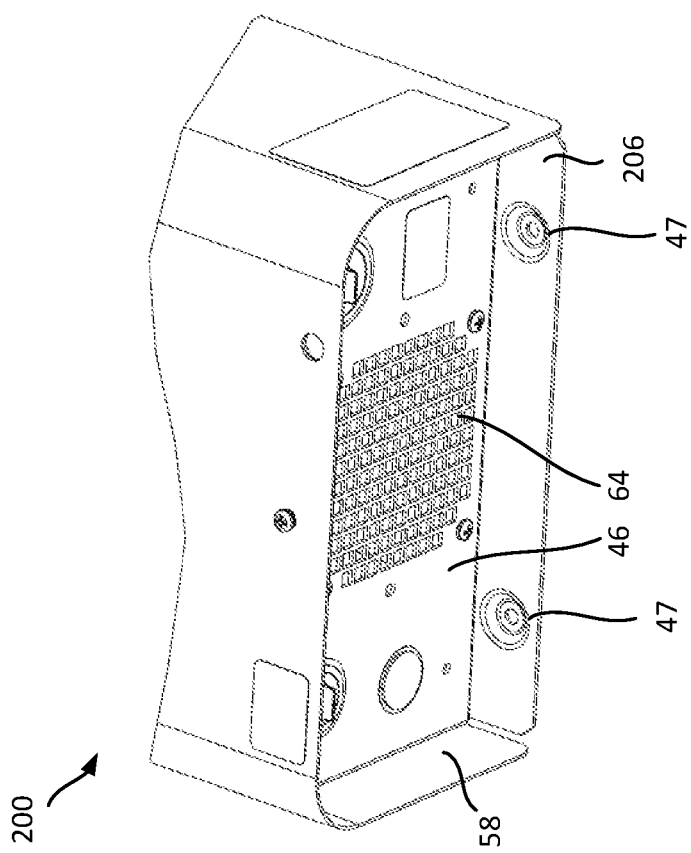
Figure 15:
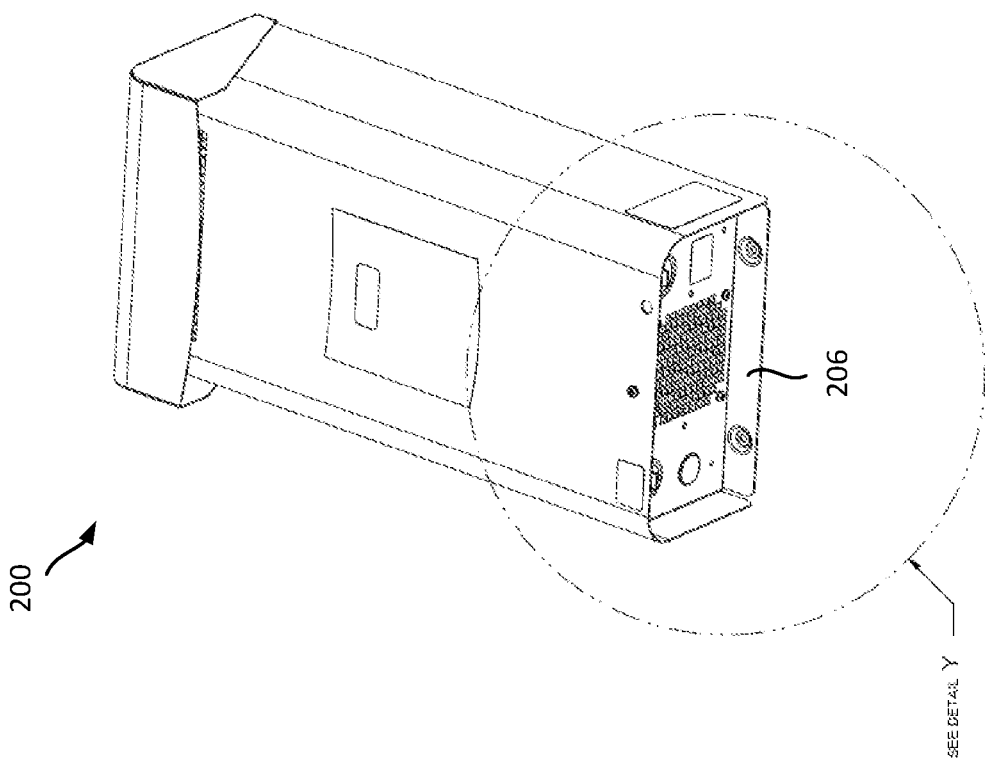

The foregoing embodiment will now be described with reference to FIGS. 14-16, which illustrate rear, front, and bottom perspective views of an enclosure 200, which comprises a mounting bracket 202 and an enclosure body 220. Enclosure body 220 includes all the elements of enclosure 40 except mounting tab 55 and mounting protrusions 47. Mounting bracket 202 includes a bracket body 204, a mounting tab 206 affixed to bracket body 204, a droplet diverter, or drip guard, 208 extending from bracket body 204, and mounting protrusions 210. Bracket body 204 contacts back wall 44 with substantially no space therebetween. Mounting tab 206 functions substantially like mounting tab 55 and mounting protrusions 210 function substantially like mounting protrusions 47. Mounting tab 206 and mounting protrusions 210 form the three-point securement feature and include holes through which securement elements pass to secure mounting bracket 202 to the support structure. A space, or water channel, is formed between the support structure and mounting bracket 202. When it rains, water droplets may drip through the space. Bracket body 204 includes keyholes (not shown) facing back wall 44 and back wall 44 has matching features that couple to the keyholes to mount back wall 44, and thus enclosure body 220, to mounting bracket 202. Enclosure body 202 is then secured to mounting bracket 202 by a screw, bolt or other threaded or rotatable locking element. Use of a mounting bracket enables application of a corrosion protection treatment to the surfaces of the enclosure, including the mounting bracket and the back wall, to prevent corrosion.

Embodiments of the invention identified above, and additional embodiments, are described below:

In embodiment A, a motor control unit (26) comprises: a rectification circuit (120); an inverter (130) to convert a direct-current voltage provided by the rectification circuit to an alternating-current voltage adapted to energize a motor (32); a fan (60) to blow air and thereby cool the rectification circuit and the inverter; and an enclosure (70) defining a housing volume (86) for the rectification circuit, the inverter, and the fan, the enclosure configured to maintain the rectification circuit and the inverter in a dry condition, the enclosure including: a back wall (44) having a top portion and a bottom portion opposite the top portion; a bottom wall (46) extending from the bottom portion of the back wall, the bottom wall having a ventilation grid (64), with the fan positioned over the ventilation grid to draw air therethrough; a top cover member (52) extending from the top portion of the back wall; a central member (54) extending between the top cover member and the bottom wall opposite the back wall; a skirt (58) below the bottom wall defining an at least partially enclosed volume (88) surrounding the ventilation grid; and a plate (72, 92) that extends below the bottom wall, wherein absent the plate a droplet of water that dripped along the back wall separates from the enclosure into freefall at a first separation point (80), the air drawn by the fan having a first velocity at substantially the first separation point sufficient to carry the droplet of water into and through the ventilation grid thereby introducing moisture into the housing volume, the plate providing a surface along which the droplet of water drips before separating from the enclosure into said freefall at a second separation point (82), the air drawn by the fan having a second velocity at substantially the second separation point lower than the first velocity and insufficient to carry the droplet of water into and through the ventilation grid.

The motor control unit of embodiment A, wherein the plate extends laterally from a left edge (49) of the back wall to a right edge (48) of the back wall.

The motor control unit of embodiment A, wherein the plate (72) extends at least partially below the bottom wall and comprises a surface facing the skirt to further enclose the partially enclosed volume and an elongate bottom edge comprising the second separation point. In one variation, the back wall and the plate have substantially coextensive widths.

The motor control unit of embodiment A, wherein the skirt and the plate extend from the bottom wall by a substantially equal amount, the elongate bottom edge of the plate and a bottom edge of the skirt providing a level edge upon which the motor control unit may be rested before installation thereby standing unsupported in an upright posture.

The motor control unit of embodiment A, wherein a width of the back wall is longer than a width of the plate, and the plate traverses a plane perpendicular to the back wall and passing through the rotation axis of the fan.

The motor control unit of embodiment A, wherein the plate is affixed to an edge formed by the back wall and the bottom wall.

The motor control unit of embodiment A, wherein the plate is affixed to the bottom wall, and the back wall and the plate extend on different planes.

The motor control unit of embodiment A, wherein the back wall and the bottom wall are comprised by an L-shaped plate.

The motor control unit of embodiment A, whereby the distance from the first separation point to the center (68) of the fan is shorter than the distance from the second separation point to the center of the fan.

The motor control unit of embodiment A, wherein the back wall, the bottom wall, the top cover member, and the central cover member form an enclosure body of the enclosure, the enclosure further comprising a mounting bracket removably secured to the enclosure body, wherein the mounting bracket comprises the plate.

In embodiment B, a motor control unit comprises a rectification circuit; an inverter to convert a direct-current voltage provided by the rectification circuit to an alternating-current voltage adapted to energize a motor; a fan to blow air and thereby cool the rectification circuit and the inverter; and an enclosure defining a housing volume for the rectification circuit, the inverter, and the fan, the enclosure configured to maintain the rectification circuit and the inverter in a dry condition, the enclosure including: a back wall having a top portion and a bottom portion opposite the top portion; a bottom wall extending from the bottom portion of the back wall, the bottom wall having a ventilation grid, with the fan positioned over the ventilation grid to draw air therethrough; a top cover member extending from the top portion of the back wall; a central member extending between the top cover member and the bottom wall opposite the back wall; a skirt below the bottom wall defining an at least partially enclosed volume surrounding the ventilation grid; and droplet diverter means for diverting a droplet of water, wherein absent the droplet diverter means a droplet of water that dripped along the back wall separates from the enclosure into freefall at a first separation point, the droplet diverter means configured to cause the droplet of water to separate from the enclosure into said freefall at a second separation point, the distance from the first separation point to the center of the fan being shorter than the distance from the second separation point to the center of the fan.

The motor control unit of embodiment B, wherein the air drawn by the fan has a first velocity at substantially the first separation point and a second velocity at substantially the second separation point lower than the first velocity and insufficient to carry the droplet of water into and through the ventilation grid.

The motor control unit of embodiment B, wherein the back wall, the bottom wall, the top cover member, and the central cover member form an enclosure body of the enclosure, the enclosure further comprising a mounting bracket removably secured to the enclosure body, wherein the mounting bracket comprises the droplet diverter means.

In embodiment C, a motor control unit comprises a rectification circuit; an inverter to convert a direct-current voltage provided by the rectification circuit to an alternating-current voltage adapted to energize a motor; a fan to blow air and thereby cool the rectification circuit and the inverter; and an enclosure defining a housing volume for the rectification circuit, the inverter, and the fan, the enclosure configured to maintain the rectification circuit and the inverter in a dry condition, the enclosure including: a back wall having a top portion and a bottom portion opposite the top portion; a bottom wall extending from the bottom portion of the back wall, the bottom wall having a ventilation grid, with the fan positioned over the ventilation grid to draw air therethrough; a top cover member extending from the top portion of the back wall; a central member extending between the top cover member and the bottom wall opposite the back wall; a skirt below the bottom wall defining an at least partially enclosed volume surrounding the ventilation grid; and a droplet diverter, wherein absent the droplet diverter a droplet of water that dripped along the back wall separates from the enclosure into freefall at a first separation point, the air drawn by the fan having a first velocity at substantially the first separation point sufficient to carry the droplet of water into and through the ventilation grid thereby introducing moisture into the housing volume, the droplet diverter providing a surface configured to cause the droplet of water to separate from the enclosure into said freefall at a second separation point, the air drawn by the fan having a second velocity at substantially the second separation point lower than the first velocity and insufficient to carry the droplet of water into and through the ventilation grid.

The motor control unit of embodiment C, whereby the distance from the first separation point to the center of the fan is shorter than the distance from the second separation point to the center of the fan.

The motor control unit of embodiment C, wherein the droplet diverter comprises a protrusion that extends outwardly from the back wall above the bottom wall and slopes downwardly, wherein the first separation point is located on a plane perpendicular to the back wall and passing through the rotation axis of the fan, the plane also passing through the protrusion, and the second separation point is located laterally away from the plane. In one variation, the droplet diverter comprises an elongate portion.

The motor control unit of embodiment C, wherein the droplet diverter comprises an indentation that extends inwardly from the back wall above the bottom wall and slopes downwardly, wherein the first separation point is located on a plane perpendicular to the back wall and passing through the rotation axis of the fan, the plane also passing through the indentation, and the second separation point is located laterally away from the plane. In one variation, the droplet diverter comprises an elongate portion. In one example, at least a portion of the droplet diverter extends from an intersection of the back wall and the plane. In another example, the droplet diverter includes a first portion and a second portion, the first portion extending outward and downward from an intersection of the back wall and the plane, and the second portion extending outward and downward from the intersection in an opposite direction than the first portion. In a further example, the droplet diverter includes a first portion and a second portion, both the first portion and the second portion extending outward and downward from an intersection of the back wall and the plane.

The motor control unit of embodiment C, wherein the droplet diverter comprises a plate that extends downward from at least one of the back wall or the bottom wall. In one example, at least a portion of the plate extends outward and downward from an intersection of the back wall and a plane perpendicular to the back wall and passing through the rotation axis of the fan.

The motor control unit of embodiment C, wherein the back wall, the bottom wall, the top cover member, and the central cover member form an enclosure body of the enclosure, the enclosure further comprising a mounting bracket removably secured to the enclosure body, wherein the mounting bracket comprises the droplet diverter. In one example, the mounting bracket includes a three-point securement feature adapted to secure the mounting bracket to a support structure, In embodiment D, a method of designing a motor control unit comprises constructing an enclosure for the motor control unit, the enclosure including: a back wall having a top portion and a bottom portion opposite the top portion; a bottom wall extending from the bottom portion of the back wall, the bottom wall having a ventilation grid; a top cover member extending from the top portion of the back wall; a central member extending between the top cover member and the bottom wall opposite the back wall; and a skirt below the bottom wall defining an at least partially enclosed volume surrounding the ventilation grid; mounting a fan over the ventilation grid; operating the fan to draw air through the enclosure; causing water droplets to drip from the back wall of the enclosure while operating the fan at a preselected speed; observing water droplets inside the enclosure; and adding a droplet diverter to the enclosure to prevent entry of the water droplets into the enclosure.

While the foregoing embodiments are disclosed with reference to a motor control unit, it should be understood that the principles of the invention are equally applicable to any enclosure having a fan on its bottom wall and which must remain in a dry state while exposed to the environment.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A motor control unit comprising:
   an inverter to convert a direct-current (DC) voltage to an alternating-current voltage;
   a fan; and
   an enclosure including:
      a back wall having a top portion and a bottom portion opposite the top portion;
      a bottom wall extending from the bottom portion of the back wall, the bottom wall having a ventilation grid, wherein the fan is adjacent the ventilation grid to draw air therethrough;
      a top cover member extending from the top portion of the back wall;
      a central member extending between the top cover member and the bottom wall to define an enclosed space; and
      droplet diverter means for diverting a droplet of water that drips along an external surface of the enclosure to prevent the droplet from freefalling from a first separation point on the enclosure and cause the droplet to freefall from a second separation point on the enclosure, the air drawn by the fan adjacent the first separation point having a first velocity sufficient to carry the droplet through the ventilation grid and the air drawn by the fan adjacent the second separation point having a second velocity which is not sufficient to carry the droplet through the ventilation grid.

2. The motor control unit of claim 1, whereby a first distance from the first separation point to a center of the fan is shorter than a second distance from the second separation point to the center of the fan, a difference between the first distance and the second distance being sufficient to reduce the air velocity and prevent the air drawn by the fan from carrying the droplet of water through the ventilation grid.

3. The motor control unit of claim 1, further comprising a skirt below the bottom wall defining an at least partially enclosed volume surrounding the ventilation grid, wherein the droplet diverter means comprises a plate that extends below the bottom wall providing a surface along which the droplet of water drips before separating from the enclosure into said freefall at the second separation point.

4. The motor control unit of claim 3, wherein the central cover member comprises a front side, a left side, and a bottom side, and wherein the central cover member extends below the bottom wall to form the skirt, further comprising a mounting bracket removably secured to the back wall and extending below the bottom wall, wherein the mounting bracket comprises the plate.

5. The motor control unit of claim 3, wherein a width of the back wall is longer than a width of the plate, and the plate traverses a plane perpendicular to the back wall and passing through the rotation axis of the fan.

6. The motor control unit of claim 3, wherein the plate is directly affixed to an edge formed by the back wall and the bottom wall or to the bottom wall.

7. The motor control unit of claim 3, wherein the back wall, the bottom wall, the top cover member, and the central cover member forming an enclosure body of the enclosure, the enclosure further comprising a mounting bracket removably secured to the enclosure body, wherein the mounting bracket comprises the plate.

8. The motor control unit of claim 1, wherein the back wall and the bottom wall are comprised by an L-shaped plate, and wherein the central cover member comprises a front side, a left side, and a bottom side, and wherein the central cover member extends below the bottom wall to form a skirt at least partially surrounding the fan.

9. The motor control unit of claim 8, further comprising a mounting bracket removably secured to the back wall, wherein the droplet diverter means includes a plate comprised by a lower portion of the mounting bracket extending below the bottom wall.

10. The motor control unit of claim 1, wherein the droplet diverter means comprises a protrusion that extends outwardly or an indentation that extends inwardly, from the back wall above the bottom wall and slopes downwardly, wherein the first separation point is located on a plane perpendicular to the back wall and passing through the rotation axis of the fan, the plane also passing through the protrusion or the indentation, and wherein the second separation point is located laterally away from the plane.

11. The motor control unit of claim 10, wherein the droplet diverter means comprises an elongate portion.

12. The motor control unit of claim 11, wherein at least a portion of the droplet diverter means extends from an intersection of the back wall and the plane.

13. The motor control unit of claim 11, wherein the droplet diverter means includes a first portion and a second portion, the first portion extending laterally and downward from an intersection of the back wall and the plane, and the second portion extending laterally and downward from the intersection in an opposite direction than the first portion.

14. The motor control unit of claim 11, wherein the droplet diverter means includes a first portion and a second portion, both the first portion and the second portion extending laterally and downward from an intersection of the back wall and the plane.

15. An enclosure assembly method comprising:
providing a top cover member;
providing an L-shaped plate defining a back wall and a bottom wall;
attaching the top cover member to the L-shaped plate;
providing a central cover member defining a front wall, a left wall, and a right wall;
attaching the central cover member to the L-shaped plate and the top cover member to form an enclosed space therebetween, wherein the bottom wall contacts the central cover member intermediate a top edge and a bottom edge thereof, thereby defining a skirt formed by a bottom portion of the central cover member;
mounting a fan adjacent the ventilation grid; and
providing droplet diverter means for diverting a droplet of water that drips along an external surface of the enclosure to prevent the droplet from freefalling from a first separation point on the enclosure and cause the droplet to freefall from a second separation point on the enclosure, the air drawn by the fan adjacent the first separation point having a first velocity sufficient to carry the droplet through the ventilation grid and the air drawn by the fan adjacent the second separation point having a second velocity which is not sufficient to carry the droplet through the ventilation grid.

16. The method of claim 15, wherein providing droplet diverter means comprises forming a droplet diverter means on the back wall.

17. The method of claim 15, wherein providing droplet diverter means comprises attaching a mounting bracket to the back wall, the mounting bracket extending below the bottom wall, the portion of the mounting bracket extending below the bottom wall defining the droplet diverter means.

18. The method of claim 15, wherein the droplet diverter means includes a first portion and a second portion, the first portion extending laterally and downward from an intersection of the back wall and the plane, and the second portion extending laterally and downward from the intersection in an opposite direction than the first portion.

19. The method of claim 15, wherein the droplet diverter means includes a first portion and a second portion, both the first portion and the second portion extending laterally and downward from an intersection of the back wall and the plane.

20. The method of claim 15, further comprising setting a speed of the fan such that the air drawn by the fan adjacent the second separation does not have enough velocity to carry the droplet through the ventilation grid.

* * * * *